(12) United States Patent
Fairclough et al.

(10) Patent No.: US 7,124,113 B1
(45) Date of Patent: Oct. 17, 2006

(54) SYSTEM AND METHOD FOR VERIFYING, SETTING, PRINTING AND GUARANTEEING CHECKS AT A REMOTE LOCATION

(75) Inventors: John F. Fairclough, Abbotsford (CA); Tadeusz J. Dragowski, Port Moody (CA); Oscar Inostroza, Port Moody (CA); Karen R. Hyman, Fullerton, CA (US); Kamyar Saberi, West Vancouver (CA); Murray Galarraga, Coqultlam (CA); Richard Calkins, Burnaby (CA); Suavek Kownacki, Surrey (CA); Esteban Gutierrez, Vancouver (CA); Robert Blake, Coquitlam (CA)

(73) Assignee: Troy Group, Inc., Santa Ana, CA (US)

( * ) Notice: Subject to any disclaimer, the term of this patent is extended or adjusted under 35 U.S.C. 154(b) by 307 days.

(21) Appl. No.: 09/717,576

(22) Filed: Nov. 21, 2000

(51) Int. Cl.
*G06T 17/60* (2006.01)

(52) U.S. Cl. .............................. 705/50; 705/1; 705/35; 705/39; 705/40; 705/53; 380/229

(58) Field of Classification Search .................. 705/1, 705/50, 40, 35, 39, 53; 380/229
See application file for complete search history.

(56) References Cited

U.S. PATENT DOCUMENTS

| | | | |
|---|---|---|---|
| 4,823,264 A | | 4/1989 | Deming |
| 5,053,607 A | * | 10/1991 | Carlson et al. ............... 705/18 |
| 5,393,963 A | * | 2/1995 | Thomas et al. ............... 705/45 |
| 5,484,988 A | | 1/1996 | Hills et al. |
| 5,504,677 A | | 4/1996 | Pollin |

(Continued)

FOREIGN PATENT DOCUMENTS

JP 63015363 A * 1/1998

(Continued)

OTHER PUBLICATIONS

Automatic Storage, Retrieval and Visualization of Bank Check Images, Alessandro Koerich; date unknown.*

(Continued)

*Primary Examiner*—James P. Trammell
*Assistant Examiner*—John M. Winter

(57) ABSTRACT

The present invention relates generally to a system and method for verifying, settling, guaranteeing and printing checks at a remote location, preferably an electronic retailer's facilities, via a network, preferably the Internet. The preferred method for verifying, settling, guaranteeing and printing checks over a network at a remote location comprises the following steps. A client computer is connected to a merchant server at a location remote from the client computer. An order is transmitted from the client computer to the merchant server. Payment by check is selected. The client computer is connected to a check server. Customer data is input to the client computer. The customer data is transmitted from the client computer to the check server. The customer data is transmitted from the check server to a check verification server. The check verification server transmits an approval, preferably comprising the customer data and a guarantee of payment to a merchant, to the client computer and the check server. The merchant server confirms the client computer's order by electronic mail message to both the client computer and the check server. The approval from the check verification server is stored in a merchant file in the check server. The merchant file is downloaded from the check server to a check printing station at the location remote from the client computer. A secure printer, preferably a magnetic ink character recognition-enabled printer, connected to the check printing station prints a check. The merchant can then cash the check as a standard bank draft.

14 Claims, 2 Drawing Sheets

U.S. PATENT DOCUMENTS

| | | |
|---|---|---|
| 5,727,249 A | 3/1998 | Pollin |
| 5,832,463 A | 11/1998 | Funk |
| 5,940,811 A | 8/1999 | Norris |
| 5,966,698 A | 10/1999 | Pollin |
| 5,974,146 A * | 10/1999 | Randle et al. ................ 705/77 |
| 6,041,315 A | 3/2000 | Pollin |
| 6,047,268 A * | 4/2000 | Bartoli et al. ................ 705/35 |
| 6,105,007 A | 8/2000 | Norris |
| 6,164,528 A | 12/2000 | Hills et al. |
| 6,230,148 B1 * | 5/2001 | Pare et al. ................... 705/40 |
| 6,338,049 B1 * | 1/2002 | Walker et al. ................ 705/44 |
| 6,354,491 B1 | 3/2002 | Nichols et al. |
| 6,611,351 B1 * | 8/2003 | Simonoff .................. 358/1.18 |

FOREIGN PATENT DOCUMENTS

| | | |
|---|---|---|
| JP | 2001236435 | 8/2001 |

OTHER PUBLICATIONS

Entrepreneur Research Center, Inc., website, www.erci.com, Copyright, 1999.

* cited by examiner

SYSTEM AND METHOD FOR VERIFYING, SETTING, PRINTING AND GUARANTEEING CHECKS AT A REMOTE LOCATION

BACKGROUND OF THE INVENTION

1. Technical Field

The present invention relates generally to a system and method for verifying, guaranteeing and printing checks at a remote location, preferably an electronic retailer's facilities, via a network, preferably the Internet or the ACH network.

2. Background Art

Numerous consumers have checking accounts with no credit cards. These consumers may prefer the security of receiving a canceled check draft for record purposes and for the purpose of disputing unauthorized drafts. These consumers may be precluded from making purchases from electronic retailers. Even among those that do pursue check purchases from electronic retailers, these consumers may not promptly receive their purchases.

The prior art comprises several devices and methods for processing checks. For example, U.S. Pat. No. 5,484,988 to Hills, et al, describes a check-writing point of sale system. However, this system is a merchant driven system used to process a transaction at the point of sale, namely a store. The system is used on a public switched telephone network and may not provide sufficient security for use over the Internet. Moreover, the system does not produce a paper check draft.

A system is required which is easy to use, provides security to both the electronic customer and retailer, and that maintains the use of a paper check draft.

SUMMARY OF THE INVENTION

The present invention relates generally to a system and method for verifying, settling, guaranteeing and printing checks at a remote location, preferably an electronic retailer's facilities, via a network, preferably the Internet. The preferred method for verifying, settling, guaranteeing and printing checks over a network at a remote location comprises the following steps. A client computer is connected to a merchant server at a location remote from the client computer. An order is transmitted from the client computer to the merchant server. Payment by check is selected. The client computer is connected to a check server. Customer data is input to the client computer. The customer data is transmitted from the client computer to the check server. The customer data is transmitted from the check server to a check verification server. The check verification server transmits an approval, preferably comprising the customer data and a guarantee of payment to a merchant, to the client computer and the check server. The merchant server confirms the client computer's order by electronic mail message to both the client computer and the check server. The approval from the check verification server is stored in a merchant file in the check server. The merchant file is downloaded from the check server to a check printing station at the location remote from the client computer. A secure printer, preferably a magnetic ink character recognition-enabled printer, connected to the check printing station prints a check. The merchant can then cash the check as a standard bank draft.

BRIEF DESCRIPTION OF THE DRAWINGS

The objects and features of the present invention, which are believed to be novel are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a system and method for verifying, settling, guaranteeing and printing checks at a remote location.

Figure 1:
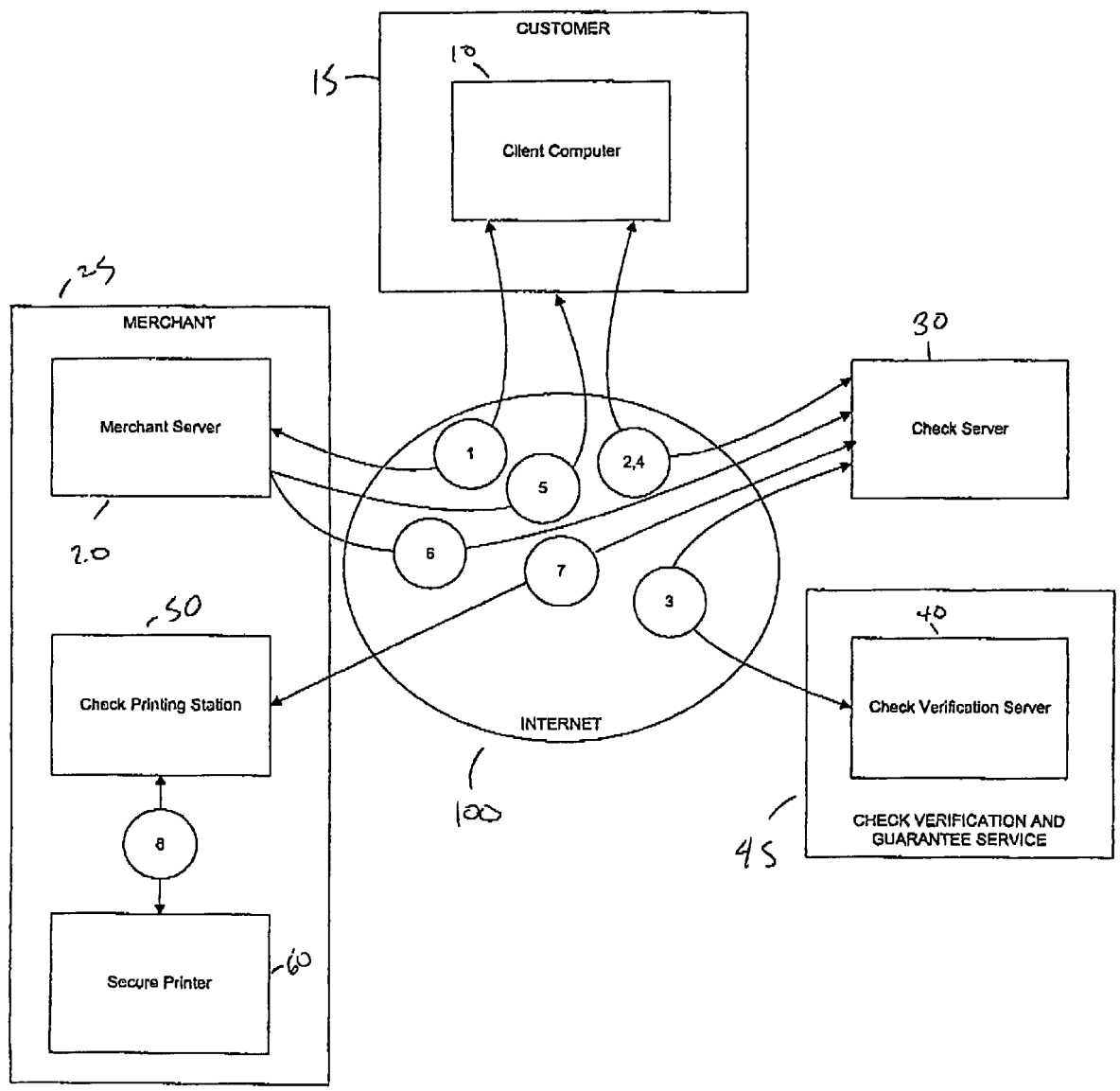
FIG. 1 is a diagram of a preferred system.

Referring now to FIG. 1, a preferred overview of the system for verification, settling, guarantee and printing of checks. (1) A client computer 10 is connected to a merchant server 20 via a network, preferably the Internet 100 or the Automated Clearing House ("ACH") network. A customer 15 selects and the client computer 10 transmits an order for, inter alia, goods or services to the merchant server 20. The customer 15 then selects a method of payment such as credit card or check. (2) If the customer 15 selects payment by check, the client computer 10 is connected to a check server 30, preferably, via the Internet 100, and control of the system is transferred to the check server 30. Preferably, this connection is transparent to the customer 15. The customer 15 inputs customer data, preferably personal identification information and checking account information, to the client computer 10 that transmits the customer data to the check server 30.

(3) The check server 30 transmits the customer data to a check verification server 40, preferably maintained by a check verification and guarantee service 45 such as Equifax. The check verification server 40 determines whether an approval should be issued based upon, inter alia, the customer data, and/or prior credit history of the customer 15. If the check verification server 40 issues the approval, the approval is transmitted to the check server 30. Preferably, the approval comprises a guarantee of payment from the check verification and guarantee service 45.

(4) After receiving the approval from the check verification server 40, the check server 30 forwards the approval to merchant server 20 via the client computer's browser 12 and transfers control of the system back to the merchant server 20. The check server 30 also stores the approval in a merchant file.

(5) The merchant server sends a message, preferably an electronic mail message, to the client computer 10 confirming the purchase and then (6) sends a message to the check server 30 confirming and acknowledging that the purchase has been completed.

(7) The merchant file is downloaded from the check server 30 to a check printing station 50 or an ACH settlement system at the location remote from the client computer, preferably the merchant's location 25. The merchant file can be transmitted to an ACH settlement system or can be downloaded at any time from the check server 30 and can comprise one or more approvals for check printing. The check printing station 50 can be the merchant server 20 or separate computer. Preferably, a separate computer is used so that a large volume print job does not slow the merchant server 20. Preferably, the check printing station 50 is running a Microsoft Internet Explorer® Internet browser.

(8) A secure printer 60, preferably a TROY® MICR 2100, a magnetic ink character recognition-enabled laser printer (MICR printer), is connected to the check printing station 50. The MICR printer 60 prints a check corresponding to each approval in the merchant file. The merchant 25 can then cash the check as a standard bank draft.

Figure 2:
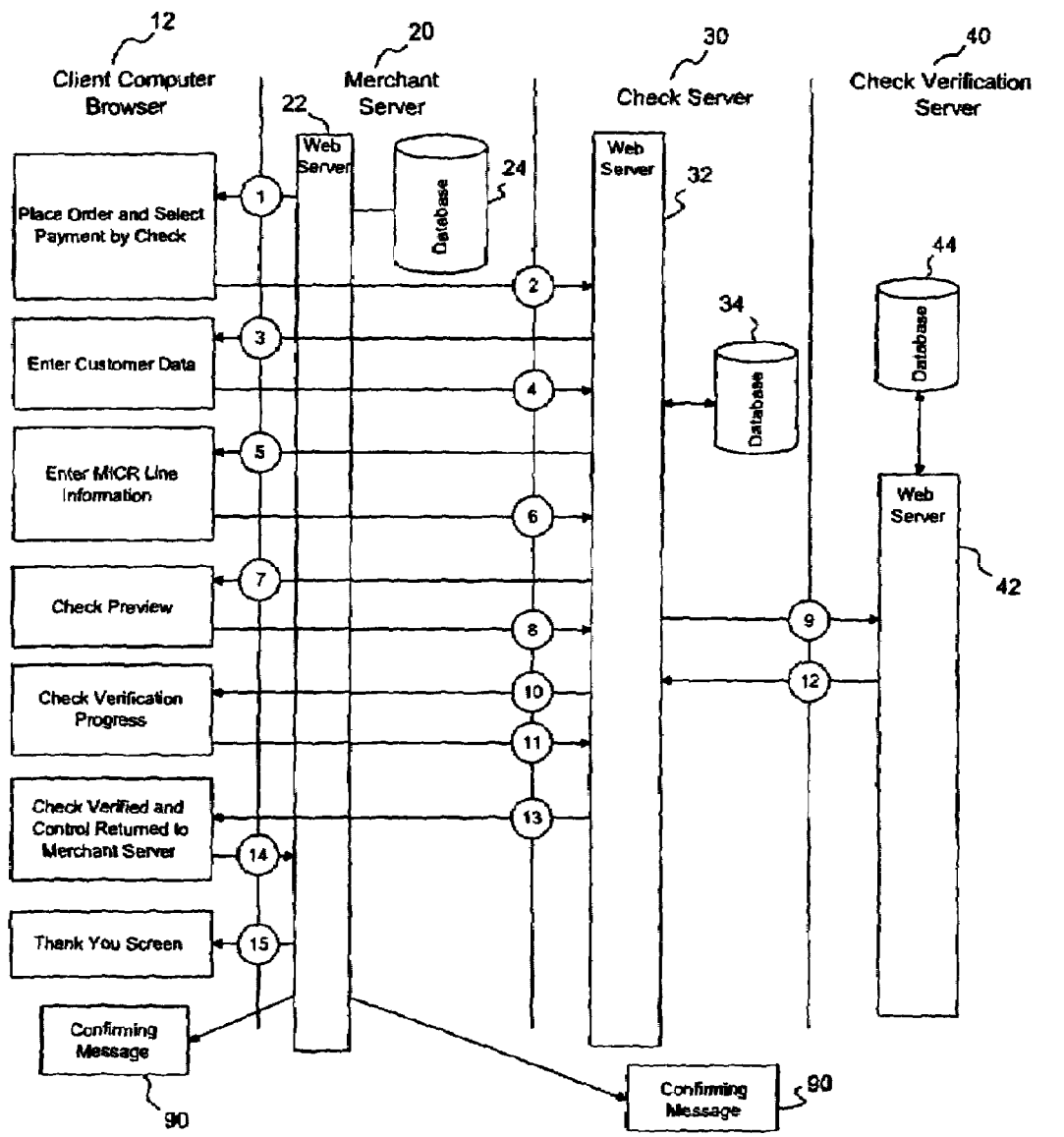
FIG. 2 is a diagram of a preferred execution of the method.

Referring now to FIG. 2, the diagram shows a preferred detailed description of the check verification and, if requested, guarantee process. (1) The merchant server 20 has a web server 22 and merchant database 24. The customer 15 views a web site, preferably via the Internet 100, on the merchant server with the client computer browser 12 running on the client computer 10. The customer places an order for, inter alia, goods or services and selects payment by check. Preferably, the merchant server 20 uses HTML source code in the web site that allows the customer 15 to select payment by check by clicking a button.

(2) The HTML source code also transfers control of the system to the check server 30. This transfer is, preferably, transparent to the customer 15. The HTML source code transmits any customer data regarding the customer 15 stored in the merchant database 24 to the check server 30. The HTML source code also transfers mandatory data regarding the order such as a merchant identification number, a total dollar amount of the check to be issued, a transaction code for the merchant 25 to reference the order, a guarantee code, and an indicator whether the check is to be printed now (generally, when goods are available) or later (generally, when goods are not available.)

(3) The check server 30 responds by displaying a request for customer data, such as name, address, telephone number, and electronic mail address, on the client computer browser 12. The check server 30 comprises a web server 32 and a check server database 34. If the merchant server 20 has transmitted any customer data stored in the merchant database 24 to the check server 30, it is displayed in the request as filled in fields. Missing customer data, if any, would preferably be highlighted for the customer 15 to fill in. Preferably, the customer 15 can select whether the check will be a personal check or a company check. If the merchant server 20 does not transmit the mandatory data to the check server 30, an error message is transmitted to the client computer browser 12 stating that the order cannot be accepted.

The check server 30 also generates a unique number, preferably hidden from the customer 15, associated with the order. This number is passed through all HTML dialogs for the customer 15 and is used to associate a proper record in the merchant database 24 and the check server database 34 with the customer 15.

(4) After entering customer data, the customer 15 clicks a "Continue" button. If any required customer data is missing, the customer 15 will be prompted to provide it on the browser 12 to continue. If all required customer data is entered, the customer data is transmitted to the check server 30. Preferably, the required customer data will include: merchant identification number, check amount, transaction code, title at company (if applicable), first name, last name, middle initial, street address, optional address, city, state, zip code, country code, phone number, and email address.

(5) The check server 30 responds by requesting MICR Line information from the customer 15 preferably including the customer's date of birth, driver's license number and state, check payee, check amount, check routing number, checking account number, and check number. If any MICR line information is missing, the check server 30 would prompt the customer 15 to provide the MICR line information in order to continue.

(6) If all MICR line information is entered, the MICR line information is transmitted to the check server 30. Preferably, the check server 30 will then verify the routing number against a database 34 of valid routing numbers such as the Thomson Financial Database of Routing & Transit Number Base File. If the routing number is invalid, the customer 15 is prompted to correct the routing number.

(7) If the routing number is valid, the check server 30 responds by showing the customer 15 a preview of the check to be drafted, preferably, with a select box containing the list of the branches of the bank sharing the same routing number. "None" is, preferably, also an option for the branch select box. The customer's bank name will be verified and branch information (name and address) will be obtained from the database 34. Preferably, this database 34 is periodically updated. If the check preview is incorrect, the customer 15 can correct it before continuing.

(8) If the check preview is correct, the customer 15 transmits branch information to the check server 30 by clicking a submit button. Preferably, the check server 30 reviews the customer data and MICR line information for duplications. If there is another similar transaction with the same customer 15, same amount and same check number, the check server 30 will prompt the customer 15 for verification.

(9) The check server 30 transmits a check server identification number and the customer data and MICR line information to a check verification server 40 preferably maintained by a check verification and guarantee service 45 such as Equifax. The check verification server preferably comprises a web server 42 and a check verification database 44. The check server identification number identifies the check server 30 to the check verification server 40. The merchant identification number in the customer data also identifies the merchant 25 to the check verification server 40. The guarantee code identifies whether or not the check is to be guaranteed by the check verification and guarantee service 45. Once the check verification server 40 receives the information, the check verification server 40 processes the information for verification and, if indicated, guarantee purposes.

(10) While the check verification server 40 processes the information, a progress screen is displayed on the client computer browser 12. Preferably, the progress screen comprises the preview of the check and a progress bar indicating the time until the check verification server 40 is finished.

(11) The client computer browser transmits a request for information to the check server 30 after a predetermined interval, preferably three seconds, to see if the check has been verified. If the check has not been verified yet, an updated progress screen is displayed comprising the preview of the check and a longer progress bar.

(12) The response from the check verification server 40 is transmitted to the check server 30. The check verification server 40 transmits a response code. The response code can be, inter alia, an error code, a request for more or corrected information code, or an approval. The approval preferably comprises an approval code and, if requested by the merchant server 20, a guarantee of payment from the check verification and guarantee service 45. The response code is stored in a merchant file in the check server database 34.

(13) If the check server 30 receives an error code, the check server 30 sends a rejection page for display on the client computer browser 12. If the check server 30 receives the request for more or corrected information, the check server 30 transmits the request to the customer 15 for more or corrected information. If the check server 30 receives the approval, the check server 30 transmits the preview of the check plus a message indicating that the check was verified and, if applicable, guaranteed. Control is then returned to the merchant server 20.

(14) The client computer browser 12 then transmits a result code to the merchant server 20. The result code comprises the transaction code and a code indicating that the check was rejected, verified, or verified and guaranteed.

(15) The merchant server 20 transmits a thank you message screen to the client computer browser 12. Preferably, the merchant server 20 also transmits a confirming message 90, preferably by electronic mail, to the customer computer 10 and the check server 30 confirming the purchase. Preferably, the check server's receipt of the message permits printing of the check.

As described above, the merchant file can be downloaded from the check server 30 to the check printing station 50 at any time following the verification/guarantee process.

Preferred System Set-Up

Preferably, the check server 30 is located in a temperature-controlled room. The room is equipped with its own air conditions and temperature control system. The check server 30 has an uninterrupted power source (UPS). The check server 30 is Microsoft® Windows NT® server. The database 34 uses Microsoft® SQL Server 7.0. For security, all servers have two Ethernet adapters, each with a different IP address. The data storage for the database is protected by use of a RAID 5 disk array.

Preferred System Security

All transmissions between the merchant server 20 and client computer browser 12, the merchant server 20 and the check server 30, and the check server 30 and the check verification server 40 are encrypted. The merchant server 20 has a merchant's digital certificate for use as an encryption key for transmissions with the check server 30. The check server 30 will have a check server's digital certificate for use as an encryption key for transmissions with the check verification server 40. Preferably, all transmissions between the client computer browser 12 and the merchant server 20 or check server 30 use Secure Socket Layer (SSL) forty-bit encryption. The check printing station 50 must use an identification and password log-in to access the merchant file on the check server 30.

Therefore, the present invention has several advantages over the prior art. The system and method allow customers to purchase goods and services from electronic retailers on the Internet using a check. The retailer obtains a verified and, if requested, guaranteed payment and an actual paper bank draft for deposit. The customer gains expanded access to his/her checking account without use of a debit card or credit card. The customer allows retains the security of receiving a canceled check for dispute-resolution and record keeping purposes.

In each of the above embodiments, the different positions and structures of the present invention are described separately in each of the embodiments. However, it is the full intention of the inventor of the present invention that the separate aspects of each embodiment described herein may be combined with the other embodiments described herein. Those skilled in the art will appreciate that adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method for printing and verifying checks over a network comprising the steps:

connecting a client computer to a merchant server at a location remote from the client computer;

transmitting an order from the client computer to the merchant server;

using the client computer to select payment by check;

connecting the client computer to a check server;

inputting customer data at the client computer;

transmitting customer data from the client computer to the check server;

transmitting customer data from the check server to a check verification server;

confirming the order or payment by a message from the merchant server to the client computer and the check server by sending an electronic mail message to the client computer and the check server, where receipt of the confirming electronic message by the check server determines whether printing of the check is permitted;

transmitting an approval from the check verification server to the check server;

storing the approval from the check verification server in a merchant file in the check server;

transmitting an approval from the check verification server to the client computer;

downloading the merchant file from the check server to a check printing station; and printing a check including data from the check server as a negotiable instrument at the remote location.

2. The method of claim 1 where the check is printed by a secure printer connected to a check printing station at the remote location.

3. The method of claim 1 where the check is printed using a secure printer connected to the check printing station and the secure printer is a magnetic ink character recognition-enabled printer.

4. The method of claim 1 where the network is the Internet.

5. The method of claim 1 where the approval comprises the customer data transmitted from the client computer to the check server.

6. The method of claim 1 where the approval comprises a guarantee of payment to a merchant.

7. A system for settling and verifying checks over a network comprising:

a client computer connected via a network to a merchant server at a location remote from the client computer;

a merchant server connected to a check printing station, a printer and a check server via a network, the check printing station, the printer, and the check server being at a location remote from the client computer;

the check server connected via a network to a check verification server at a location remote from the client computer, the merchant server, the check server, the printing station, and the printer;

the check server comprising a merchant file, the merchant file comprising an approval transmitted from the check verification server, information identifying an order transmitted from the client computer to the merchant server, and customer data inputted into the client computer and transmitted from the client computer to the check server;

the check printing station comprising a copy of the merchant file downloaded from the check server such that the check printing station can use the downloaded merchant file to print a check using the printer; and the merchant server comprising a mechanism for confirming the order or payment to the client computer and the client verification server.

8. The system of claim 7 where the network is the ACH network.

9. The system of claim 7 where the network is the Internet.

10. The system of claim 7 where the printer is a magnetic ink character recognition-enabled printer.

11. A method for printing and verifying checks over a network for a customer to remotely purchase goods or services from a merchant using a check printed by the merchant, the method comprising;

A customer utilizing a web browser to make a purchase selection, preview the check before it is printed and authorize printing of the check, a merchant downloading a merchant file from a check server accessed via the Internet and utilizing the merchant file to print a check including magnetic ink characters that identify a customer's checking account in a first location as payment for a customer's selection, from a second location remote from the first location, of goods and/or services offered by the merchant; where the check being a negotiable instrument when printed by the merchant.

12. The method of claim 11 wherein the customer utilizes a web browser to make the selections, to preview the check before it is printed, and to authorize the merchant to print the check.

13. The method of claim 11 wherein the merchant prints the check by downloading a merchant file from a check server accessed via the Internet and utilizing the merchant file at a check printing station to print the check.

14. The method of claim 11 further comprising:

connecting by a customer computer to a merchant web server at a location remote from the customer computer, viewing a merchant web site located on the merchant server and comprising hypertext markup language (HTML) source code and a merchant database, selecting goods or services from the web site, and selecting payment by check for the selected goods and services, where payment selection is accomplished by means allowed by the HTML source code of the merchant web site; then using the HTML source code of the merchant web site to cause the web browser to connect to a check web server that is not the merchant web server or the client computer, where the web server includes a check server database, transmit customer data stored in the merchant database to the check server, transmit transaction data to the check server, the transaction data including an indicator of whether to print a check immediately or at a later time; then using the web browser on the client computer to display a request from the check server for customer data with fields, filled in by customer data in the merchant database; passing a unique number generated by the check server and used to associate a proper record in the check server database with the customer to the merchant web server, the merchant web server using the unique number to associate a proper record in the merchant server database with the customer, transmitting magnetic ink character recognition (MICR) line information including a routing number to the check web server, the check web server verifying the validity of the routing number and causing the web browser to prompt the customer for a correct routing number if the routing number is invalid, obtaining an approval from a check verification web server of a check verification service provided, the approval indicating a guarantee of payment by the check verification service provided, and to storing the obtained approval in a merchant file.

* * * * *